United States Patent [19]

Broderick

[11] 4,365,726

[45] Dec. 28, 1982

[54] PRESSURE VESSELS CLOSURE MEANS

[75] Inventor: Michael Broderick, Dublin, Ireland

[73] Assignee: Odenberg Investments Limited, Blackrock, Ireland

[21] Appl. No.: 304,094

[22] Filed: Sep. 21, 1981

[30] Foreign Application Priority Data

Sep. 25, 1980 [IE] Ireland .................................. 2010/80

[51] Int. Cl.³ ...................... B65D 55/00; B65D 43/20
[52] U.S. Cl. .................................... 220/211; 220/345; 220/314; 220/346; 40/210; 49/211; 49/221
[58] Field of Search ............... 220/345, 346, 211, 314; 49/221, 211, 209, 225, 360, 210; 244/419; 422/295, 242

[56] References Cited

U.S. PATENT DOCUMENTS

| | | |
|---|---|---|
| 3,235,103 | 2/1966 | Loveless . |
| 3,311,255 | 3/1967 | Loveless . |
| 3,386,206 | 6/1968 | Loveless .......................... 220/345 X |
| 3,417,881 | 12/1968 | Loveless . |
| 3,417,896 | 12/1968 | Loveless ............................. 220/211 |
| 4,256,701 | 3/1981 | Johansson ......................... 49/210 X |

FOREIGN PATENT DOCUMENTS 2610961 9/1977 Fed. Rep. of Germany .
2040024 8/1980 United Kingdom .

Primary Examiner—George T. Hall
Attorney, Agent, or Firm—Stevens, Davis, Miller & Mosher

[57] ABSTRACT

A closure for a large sized opening in a pressure vessel has a lid longitudinally movable between an open covering position in which it is aligned with the opening but spaced apart from it, and perpendicularly displaceable between the covering position and sealing position in which it engages the sealing edge of the opening. The lid is moved by a hydraulic or pneumatic ram between the open and covering positions and is carried by rollers mounted on shafts affixed to the lid which run on longitudinal support surfaces. The shafts are rotatably mounted in bearings fixed to the lid and are coupled together for simultaneous rotation, while the rollers are eccentric relative to the bearings. The ram applies torque to the shafts in one sense during closing movement of the lid and in the opposite sense during opening movement of the lid. A follower member or members fixedly secured to one of the shafts engage(s) guide means which prevent the shafts rotating during movement of the lid between the open and covering positions. When the lid reaches the covering position, engagement between the follower member or members and the guide means ceases so that the shafts rotate and the lid is displaced from the covering position to the sealing position by the relative eccentricity of the rollers and bearings. A cam surface is provided for guiding at least one follower member during return displacement of the lid between the sealing position and the covering position. Two embodiments of the invention, applied to top and bottom closures, are described.

10 Claims, 11 Drawing Figures

PRESSURE VESSELS CLOSURE MEANS

BACKGROUND OF THE INVENTION

The present invention relates to a closure for an opening of large size in a pressure vessel, more particularly to a closure for such an opening in a canning retort, for example, the upper or lower opening in a canning retort.

Canning is widely used in the food processing industry, and consists of a process in which food is sealed into a metal container. The advantages of canning are many and well known. However, an essential step in the process is sterilisation at high temperature and pressure. This operation is carried out in retorts, which are large pressure vessels into which the cans are placed. Generally the retorts have openings at the top and bottom to facilitate loading and unloading, and these openings must be sealed during the sterilisation process. The doors or lids provided to seal these openings are large and heavy and may typically exceed a square meter in area. Various means have been developed for closing and sealing these doors and a particular known closure is described in U.S. Pat. No. 3,386,206. The door is movable across the opening and mounted on rollers. The door is first moved from a position in which it exposes the opening into a position in which it is spaced from the opening. The rollers are themselves mounted eccentrically on shafts rotatably mounted on the door by means of bearings. These shafts are then rotated and the relative eccentricity of the shafts and rollers causes the door to to move perpendicular to its plane and to seal the opening by pressing against a sealing ring in a recess in the sealing edge of the opening. In order to avoid damage to the sealing ring it is important for the perpendicular movement to take place without the door moving in its own plane. Such movement would scuff the sealing ring or pull it out of its recess. Separate means are provided to move the door from the position in which it exposes the opening and to rotate the shafts to bring about the sealing or locking of the door. For the first-mentioned movement, hydraulic or pneumatic cylinders may be provided or a rack and pinion or a wire drive. For the sealing operation, a further pneumatic or hydraulic cylinder is used.

The above-mentioned U.S. patent is directed in particular to a top closure. U.S. Pat. No. 3,417,896 discloses a similar bottom closure in which the door sealing or locking movement is again brought about by rotation of eccentric rollers. In this instance the detailed construction differs, in order to suit the upward sealing movement necessary in the case of a bottom closure, and to provide secure sealing on all sides of the door. In particular, the eccentric rollers are arranged to act as cam members bearing upwardly on the lower surface of the door.

The closures described in the above Patent Specifications operate satisfactorily in respect of keeping the door away from the sealing edge during movement of the door across the mouth of the opening, and sealing and unsealing displacement of the door only takes place in a direction perpendicular to the plane of the door. Thus these constructions avoid causing damage to the sealing ring in the sealing edge. However they incorporate a considerable number of operating parts. Consequently the number of components susceptible to failure is large. In addition, many of them are exposed to the difficult environmental conditions in the region of the openings in the particular case of canning retorts or pressure vessels. It is accordingly an object of the invention to provide a closure for an opening in a pressure vessel having a small number of operating parts and to provide an improved, effective and simple means for closing a large sized opening in a pressure vessel.

BRIEF SUMMARY OF THE INVENTION

According to the invention there is provided a closure for a large sized opening in a pressure vessel, the opening having a peripheral sealing edge, and the closure comprising a lid movable in a longitudinal direction relative to the opening between an open position of the lid and a covering position in which the lid is aligned with the opening but spaced apart from the sealing edge of the opening and displaceable in a direction perpendicular to the longitudinal direction between the covering position and a sealing position in which the lid is in sealing engagement with the edge of the opening, at least two shafts rotatably mounted in bearings fixed to the lid and coupled for rotation together, rollers mounted on the shafts, said rollers being eccentric relative to said bearings and travelling on a support surface or surfaces extending in the longitudinal direction during movement of the lid between its open and covering positions, drive means for moving the lid in the longitudinal direction and for applying torque to the shafts in one sense during closing movement of the lid and in the opposite sense during opening movement of the lid, at least one follower member fixedly secured to one of the shafts, and guide means engageable by the follower member or members for preventing rotation of the coupled shafts at least during a closing movement of the lid from its open position to its covering position, said guide means being such that engagement between the follower member or members and the guide means ceases when the lid is in the covering position, thus permitting the shafts to rotate for displacement of the lid in said perpendicular direction between the covering position and the sealing position by the relative eccentricity of said rollers and bearings.

In a particular embodiment, the ends of the shafts are received between opposed spaced apart guide surfaces extending in the longitudinal direction, one of said guide surfaces being a support surface, the rollers are eccentrically mounted on said ends of the shafts and are adapted for movement in the longitudinal direction between the guide surfaces, a follower member is mounted on a lever fixedly secured to an end of one of the shafts and is adapted for movement in the longitudinal direction between surfaces of the guide means, and there is an aperture in the guide means adapted to allow the follower member to pass therethrough, passage of the follower member through the aperture permitting the shafts to rotate.

Preferably the guide means engageable by the follower member, comprises a said support surface. The follower member may be a roller and the guide means may consist of opposed spaced apart bearing surfaces, the follower member engaging against one or other of the bearing surfaces depending on the direction of longitudinal movement of the lid. A cam surface may be provided for guiding the follower member during return displacement of the lid between the sealing position and the covering position. A leading follower member may be mounted on a lever extending forwardly of the leading shaft in the closing direction of longitudinal movement of the lid. The closure may comprise at least one additional follower member, which is mounted on a lever extending rearwardly of one of the shafts, for engagement with a concave cam surface during displacement of the lid from its sealing position to its covering position. The drive means may comprise one or more hydraulic or pneumatic cylinders acting on a lever arm or arms fixedly secured to one of the shafts, the other shaft or shafts being coupled to said one shaft by means of a link member or members. At least one of said link members may comprise an abutment surface for engaging a corresponding abutment surface provided on a said lever arm for limiting rotation of the shafts during displacement of the lid from its sealing to its covering position. Stop means may be provided for terminating closing movement of the lid in the longitudinal direction when the lid reaches the covering position.

Thus the closure according to the invention provide a means of closing a large sized opening in a pressure vessel using a small number of operating parts. The closing and sealing movements of the lid are carried out by one mechanism, a latter phase of the closing operation of the mechanism providing for the sealing of the closure. The closure is suitable for many kinds of openings in pressure vessels but is particularly applicable to the top and bottom openings of canning retorts, where its relative simplicity of construction is advantageous in resisting the difficult environmental conditions.

BRIEF DESCRIPTION OF THE SEVERAL VIEWS OF THE DRAWING

Embodiments of the invention will now be described in detail, in relation to a retort for a canning installation, and making reference to the drawings, of which.

DETAILED DESCRIPTION

Figure 1:
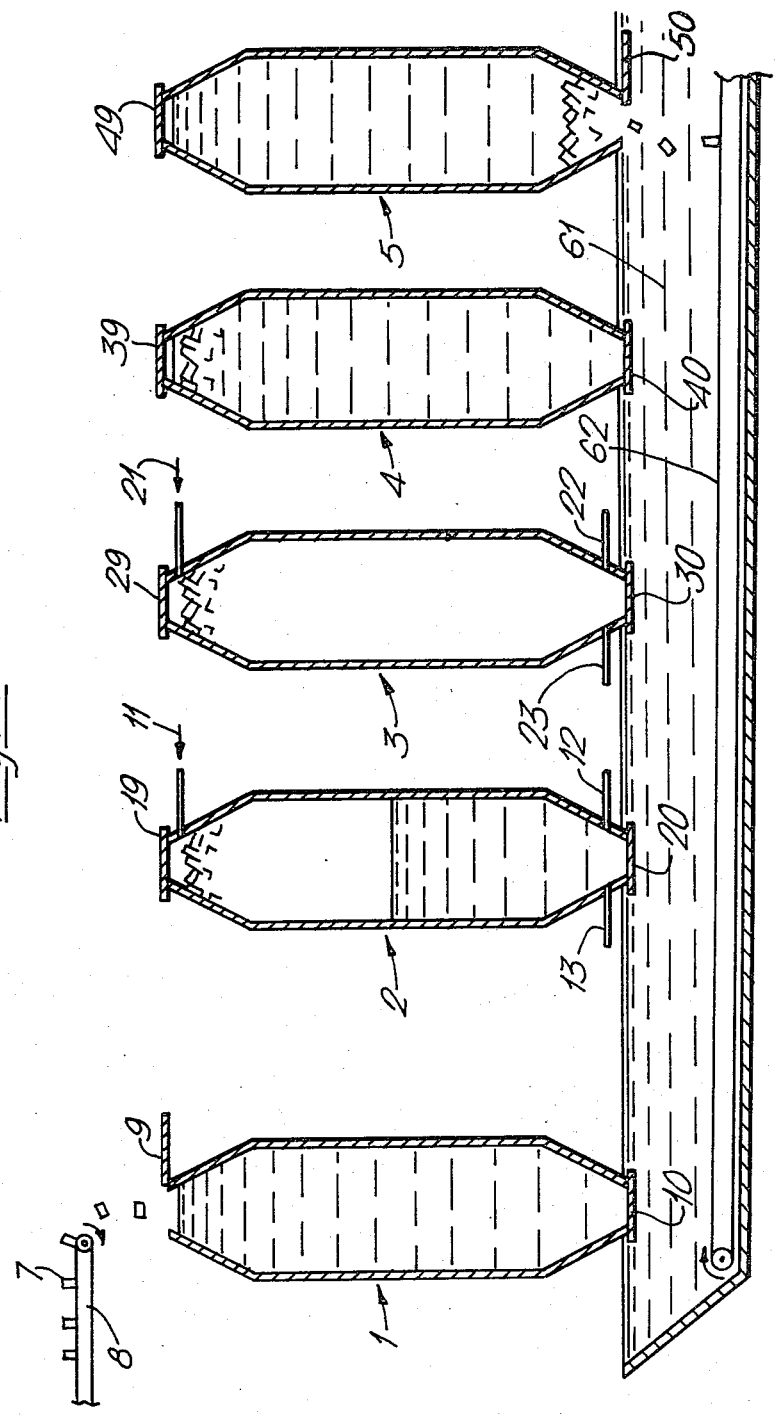
FIG. 1 shows a typical canning installation having retorts with top and bottom openings provided with closures.
Figure 2:
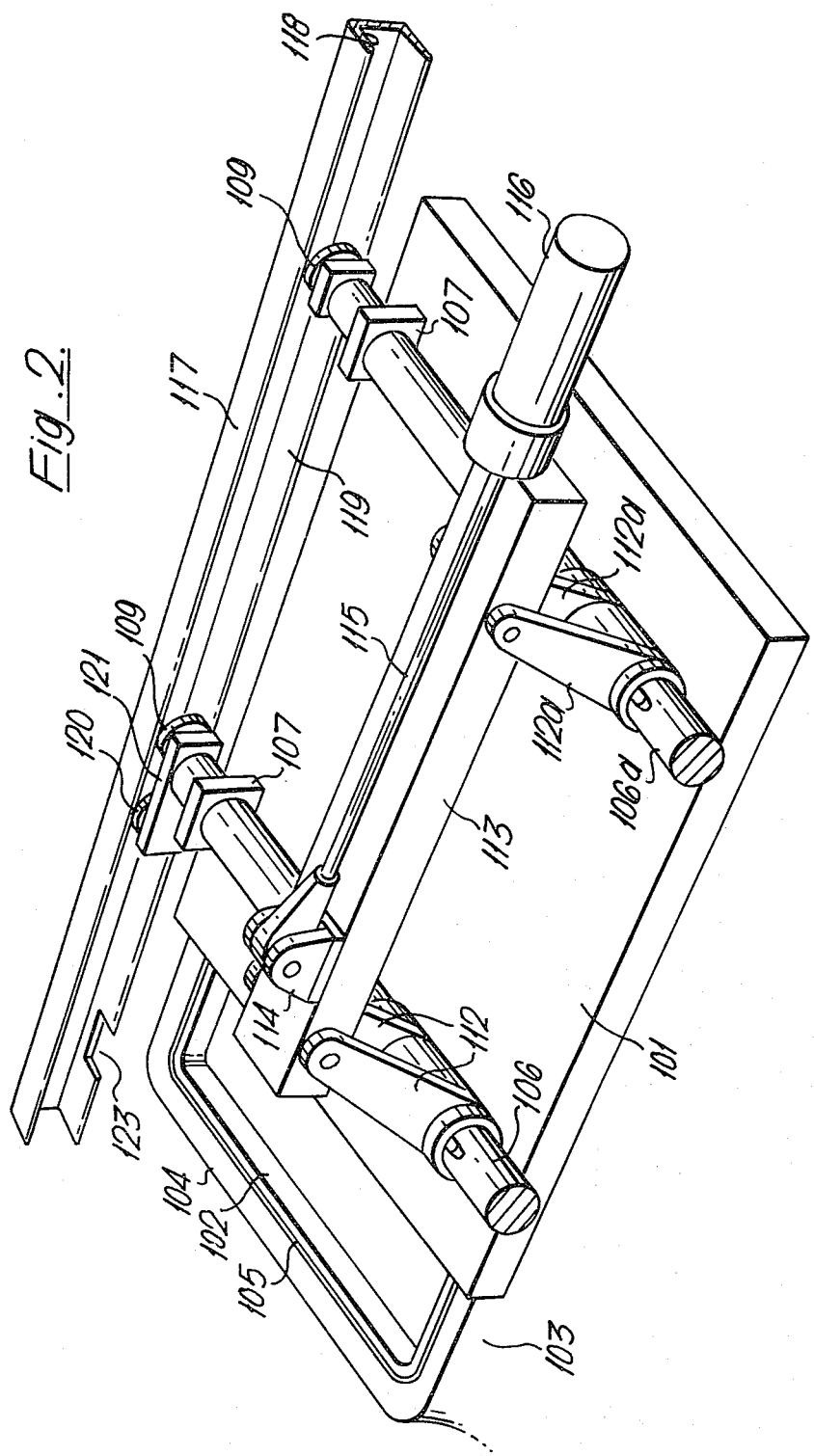
FIG. 2 shows in perspective, part of the mechanism for moving the lid of one embodiment of the invention, shown as a top closure, from an open position and for displacing it from the covering position into a sealing position to close the retort.

A typical canning installation is shown in FIG. 1, in which pressure vessels or retorts are employed, having openings for which the closure according to the invention is particularly suitable. Having regard to FIG. 1, a retort 1 is shown in a can loading configuration, a retort 2 is shown during start-up, a retort 3 during processing, a retort 4 during filling with water, and a retort 5 during discharge. The number of retorts in an installation may be varied through a wide range and five are shown in FIG. 1 for illustrative purposes only. The installation shown uses a water-filled canal with a conveyor for handling and transporting the cans upon discharge from the retorts and water from the canal is also fed into the retorts in connection with loading and discharge of the retorts.

The operation of the installation will now be briefly described. Cans 7 are brought by means of a conveyor 8 to an upper opening 9 in retort 1 and fall from the conveyor into the retort through the opening. A lower opening 10 of the retort 1 has been previously closed and the retort filled with water so that the fall of the cans into the retort is cushioned and they are not damaged. When the retort is loaded with cans, the upper opening is closed, as is shown at 19 on retort 2, and steam is admitted to the retort, as shown at 11 for retort 2. The steam is at high pressure and as it is admitted, the water in the retort 2 is forced out through the opening 12. Accordingly the water level in the retort 2 falls. A vent 13 releases entrained air. It will be clear that the admission of the steam causes the pressure within the retort to rise, and thus the openings 19 and 20 must be securely sealed, both for safety and to avoid loss of pressure.

The processing stage is shown for retort 3. Steam continues to be applied at 21 to maintain pressure within the retort 3, but the opening 22 is closed off, as all the water has been forced out of the retort by the pressure of the steam. The retort is maintained under pressure for a predetermined period to sterilise the cans. During this time the openings 29 and 30 must be maintained sealed, so that safety continues to be assured and the sterilising is satisfactorily carried out.

Retort 4 is shown with processing completed. The steam supply is now turned off and water is pumped into the retort to fill it. The upper and lower openings 39 and 40 are still kept closed. The discharge operation is shown for retort 5. The lower opening 50 is opened and the cans fall out of the retort through it into the canal 61, where the water cushions their fall so that they are not damaged. They are then taken away by a conveyor 62 for further treatment as required and for orienting or unscrambling, labelling and packaging. During the discharge operation, the upper opening 49 remains closed and the retort remains full of water. A new cycle is then commenced, as shown for retort 1, the lower opening of which has been closed while the upper opening has been opened to admit cans.

It will be seen from the above brief description that the operating conditions for the closures provided for the upper and lower openings of the retorts are extremely arduous, in that they are required to operate quickly and reliably when needed, they must close off a comparatively large opening in the wall of the pressure vessel or retort so as to preclude any leakage during the processing stage, and they must continue to operate without failure in a hostile environment. The operating environment is particularly hostile in the case of the lower opening, which may in practice be partially or wholly submerged in the canal 61. In order to make an air-tight pressure seal, a sealing ring is provided, located in a recess in the sealing edge of the opening. To avoid damage to the ring, the last stage of movement of the closure lid or door must be perpendicular to the surface of the sealing edge. Thus a two-part closing operation is required for a closure of this type, the first phase bringing the closure lid to a position adjacent to the opening and the second phase bringing it into sealing engagement with the edge of the opening. The closure according to the invention meets the various requirements noted and will now be described. In the embodiment of FIGS. 2–6, and as shown particularly in FIG. 2, a lid or door 101 for the upper opening of a retort 103 consists of a large planar plate, suitably a flat piece of metal which, as will be further described herinafter, is pressed against the sealing edge 104 of the opening 102 in a sealing position of the lid. The sealing edge 104 has a sealing member 105 of resilient material, for example, a rubber ring of circular cross-section, located in a groove in the sealing edge, to ensure that a leakproof seal is provided when the lid is pressed against the sealing edge. The lid is movable in a longitudinal direction, parallel to its own plane across the mouth of the opening to cover and uncover the opening and is displaceable in a direction substantially perpendicular to its plane to come into sealing engagement with the sealing edge 104.

Figure 3:
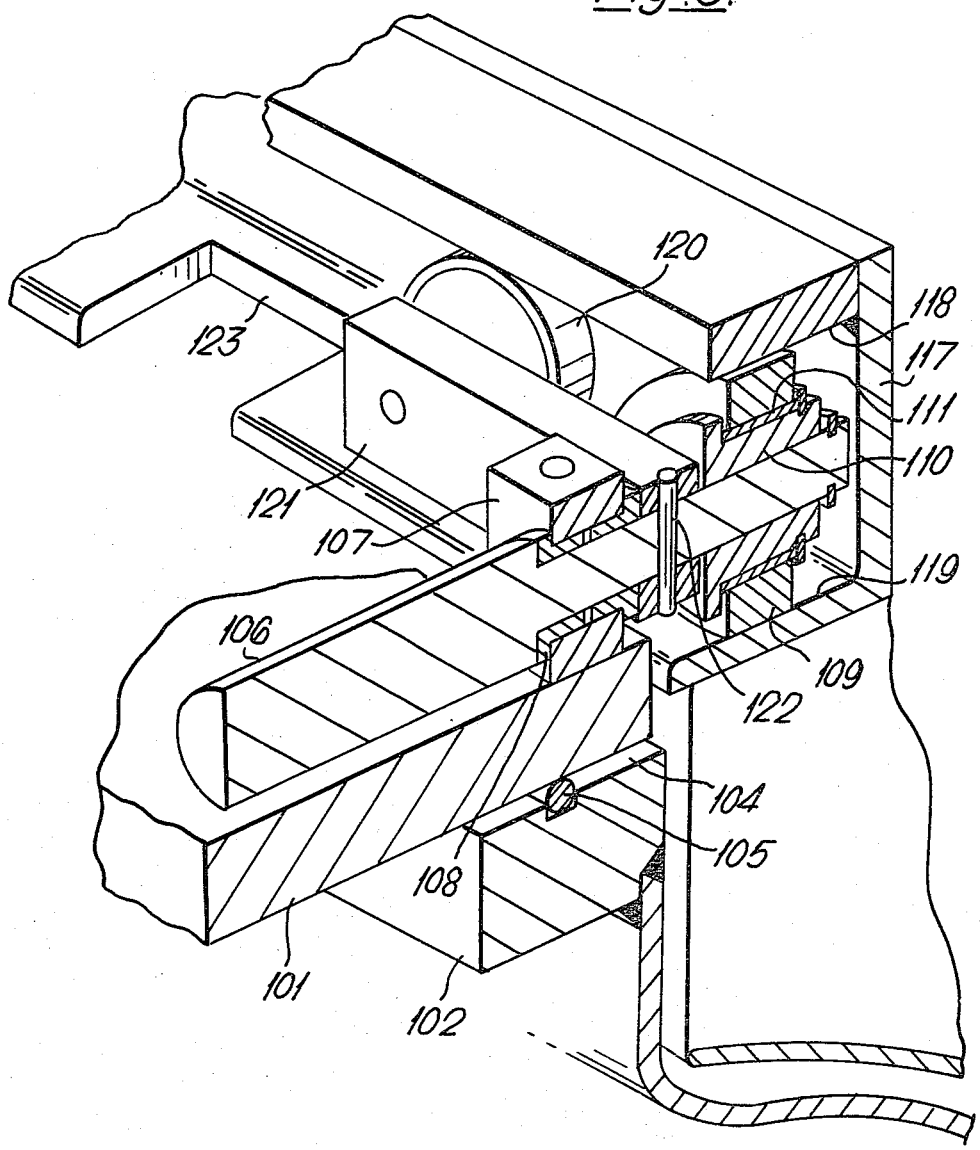
FIG. 3 is a detailed perspective view, in part section, of the support roller and guide roller mounting for the lid of the top closure of FIG. 2.
Figure 4:
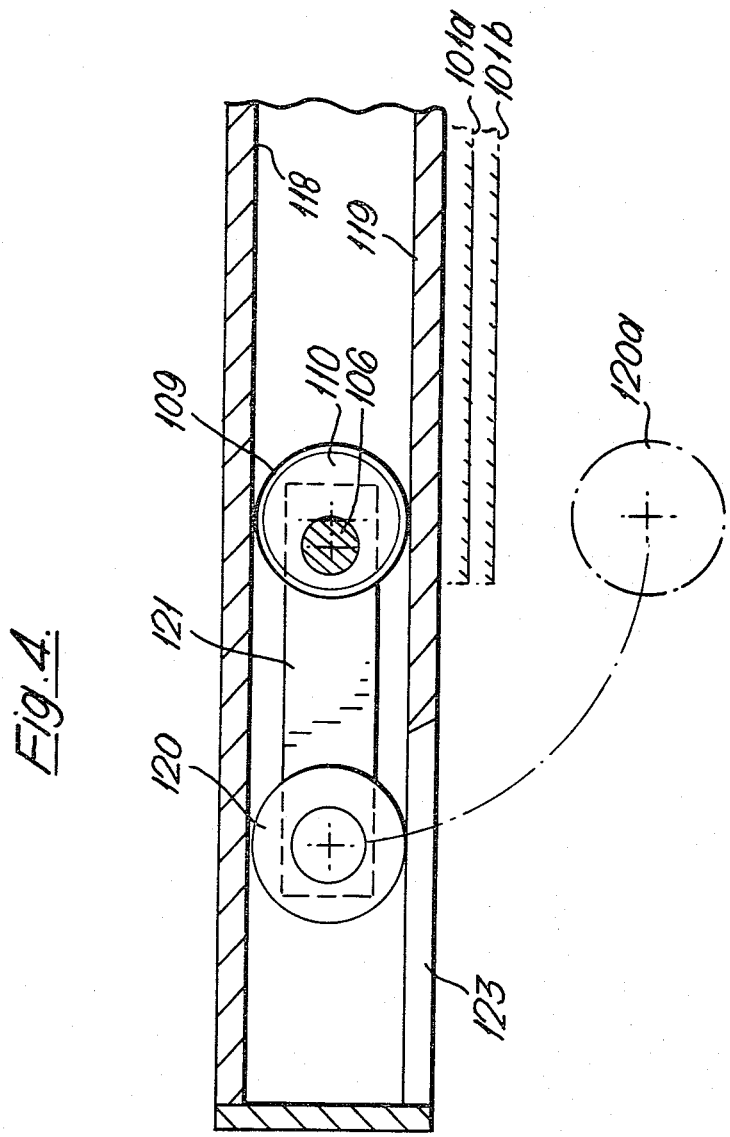
FIG. 4 shows a detail view in elevation of the arrangement of the guide roller with respect to the support roller for controlling the displacement of the lid of FIGS. 2 and 3 during the sealing stage of a closing operation.
Figure 5:
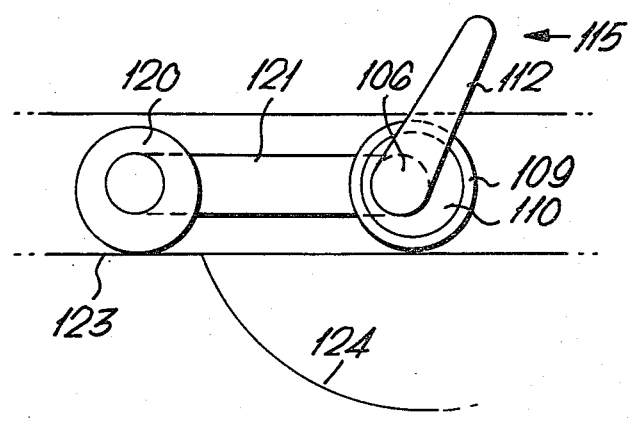
FIG. 5 shows in elevation the relationship of the rollers in the embodiment of FIGS. 2-4 immediately prior to the sealing or locking operation.

Two shafts 106 and 106a are rotatably mounted in bearing blocks 107 secured to the top surface of the lid. The rotatable mounting of the shafts may be achieved by plain bearings 108 as shown in FIG. 3 or by other suitable bearing means. An eccentric 110 is affixed to each end of the shafts 106 and 106a. A support roller 109 is rotatably mounted on each of the eccentrics 110 by means of bearings 111 which may be, for example, roller bearings. The rollers 109 support the lid for longitudinal movement between an open position and a covering position in which the lid is aligned with the opening but spaced apart from it. The eccentrics 110 are fixedly secured to the ends of the shafts so that the axes of the shafts are not aligned with the axes of the rollers 109. Thus if the shafts are rotated while the lid is stationary in respect of longitudinal movement, the axes of the shafts are displaced. This mechanical result of the relative eccentricity of the shafts and support rollers is used to bring about the sealing displacement of the lid from the covering position to the sealing position in which it is in sealing engagement with the edge of the opening. In this embodiment, the bearings by which the shafts are rotatably mounted on the lid are coaxial with the shafts while the rollers are eccentric with respect to the shaft axes. It will be clear that some kinematic result may be achieved by a construction in which the bearings are eccentric and the rollers coaxial with the shafts, and an embodiment exemplifying this construction is also hereinafter described.

Turning again to FIG. 2, the drive means for moving the lid in the longitudinal direction and the arrangement for rotating the shafts 106 and 106a are shown. Each shaft carries a pair of arms, indicated by 112 and 112a respectively. Each arm of each pair is keyed to its shaft and the ends of each pair of arms are pivotally linked by means of a link member 113. A bracket 114 is mounted near the leading end of the member 113, i.e. near its pivotal connection with the lever arms 112, and a piston rod 115 extending from a pneumatic or hydraulic cylinder 116 is pivotally connected to the bracket. It will be appreciated that other drive means may be employed and that the drive means may be connected to the shafts in different ways. Thus activation of the cylinder 116 and extension of the piston rod 115, when the lid is longitudinally stationary, will cause the shafts 106 and 106a to rotate together, thereby causing displacement of the lid in a direction perpendicular to its plane, due to the relative eccentricity of the axes of the shafts and rollers. It will be seen however that if the shafts 106 and 106a are prevented from rotating then the result of activating the cylinder will be to cause the lid to be displaced in the longitudinal direction, i.e. parallel to its own plane. In the closure according to the invention, a single drive means or cylinder is used to accomplish this movement parallel to the plane of the lid and also the final displacement of the lid into sealing engagement with the sealing edge of the opening, this sealing displacement being brought about by the last stage of the movement of the piston rod 115. How this is achieved will now be described.

Turning now to FIG. 3, it will be seen that the rollers 109 run in guide rails 117 of substantially channel section, and that the rollers bear against inwardly-directed lower surfaces 119 of the rails 117 which thus carry the weight of the lid during longitudinal movement of the lid. In addition to the eccentric support rollers 109, the leading shaft 106 carries further guide rollers 120 which are arranged forwardly of the rollers 109 at each end of the shaft 106. One such roller is shown in the FIGS. and the following description is in terms of one roller. While one roller 120 is mechanically sufficient, it is preferred that a roller is provided at each end of the leading shaft. Each of these rollers is rotatably mounted on a lever 121, which is fixedly mounted on the shaft 106 by means of a pin 122 or any other suitable means. During forward and closing movement of the rollers 109 and 120 along the guide rail 117, torque is applied to the shaft by the piston rod 115 acting at the ends of the lever arms 112, but this torque is absorbed by a reaction or force exerted by the roller 120 against the surface 119 of the guide rail 117, so that only the forward component of the force exerted by the piston rod 115 is effective to move the lid in a forward direction and rotation of the shaft is prevented. The surface 119 thus serves as a guide surface or cam surface for the guide roller 120 as well as a support surface for the eccentric support roller 109. Similarly during an opening movement of the lid, rotation of the shaft 106 is prevented by the reaction or force of the roller 120 on the inwardly-directed upper surface 118 of the channel-shaped guide rail 117, so that longitudinal movement of the lid again takes place in these circumstances. The roller 120 and the guide surfaces 118 and 119 thus constitute a follower member and guide means. It will be appreciated that any other suitable member and means of this kind may be employed, e.g. a sliding element or a pin in a slot. It will also be appreciated that the guide means may be independent of the guide rail 117 or the support surface 119, or that the guide rails may comprise support surfaces which serve as guide surfaces during a closing operation only, separate means being provided to limit rotation of the shafts during an opening operation.

The final stage of movement of the piston rod 115 causes a displacement of the lid perpendicular to its plane which is brought about by means of an aperture 123 provided in the lower surface 119 of the guider rail 117. As the guide roller 120 reaches this aperture, the reaction provided by the surface 119 against the torque exerted on the shaft 106 by the piston rod 115 is removed and the shaft is allowed to rotate as the roller 120 moves downwards through the aperture 123. Further forward movement of the lid is simultaneously prevented, for example, by the lid coming against a stop (not shown on the drawings). Looking at FIG. 4, the movement of the roller 120 is both downward and rotational about the axis of the shaft 106 through approximately 90° and its end position is arranged to be a small distance past dead centre, for example 5°, so that the lid will remain in sealing engagement with the sealing edge should power to the cylinder 116 or other drive means be cut off. This position of the guide roller is indicated by 120a. The unlocked or initial position of the lid before sealing is indicated by 101a while the locked or sealed position is shown by 101b. The displacement of the lid perpendicular to its plane will be seen to be substantially the same as the relative eccentricity of the axes of the shaft 106 and rollers 109, and is occasioned by the displacement of the shaft axis as it undergoes its approximately 90° rotation.

Figure 6:
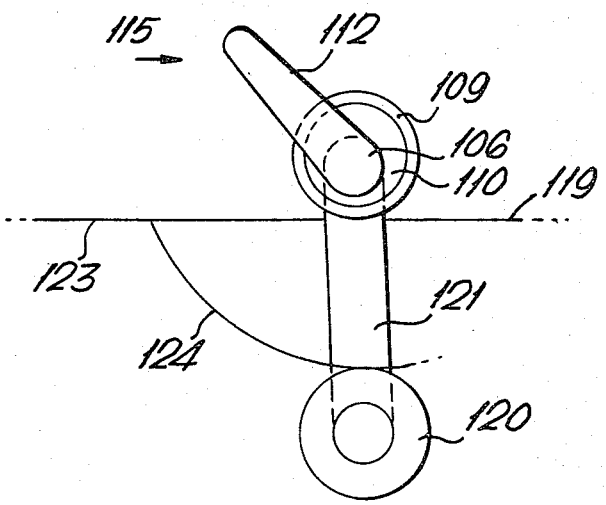
FIG. 6 shows the relationship of the rollers of FIG. 5 following completion of the sealing operation or before an unsealing operation.

The unsealing displacement of the lid from its sealing position to the covering position and its opening movement from the covering to the open position are accomplished in essentially reciprocal manner. A cam surface or guide surface 124 is provided to guide the roller 120 back up to the aperture 123 and to prevent longitudinal movement of the lid before its perpendicularly displacement is completed. It may be sufficient for a cam surface to be provided for just one of the rollers 120. The sealing and unsealing displacements of the roller 120 may be also seen from FIGS. 5 and 6. FIG. 6 shows the roller 120 about to move downwards through the aperture 123, while FIG. 6 shows it in its sealing disposition and ready to start its return movement. The relationship between the force exerted by the piston rod 115 on the arm 112 and the manner in which this brings about both the opening and closing movements of the lid and its sealing and unsealing displacements will be clear from the drawings and particularly so from FIGS. 5 and 6.

It will also be clear that during an opening movement of the lid rotation of the shafts 106 and 106a stops when the guide roller 120 contacts the guide surface 119 and that this surface prevents rotation of the shafts beyond the configuration of the mechanism in which the roller 120 is disposed at substantially the same level as the roller 109. It will also be clear that other means of accomplishing this restriction on the rotation of the shafts may be provided and that the guide surface 119 represents only one such means. Another method of restraining rotation of the corresponding components in a bottom closure is described hereinafter.

It will also be clear that the disposition of the guide roller 120 with respect to the eccentric support roller 109 may be altered within the scope of the invention, e.g. so that it follows the roller 109 during a closing movement, rather than leading it. It will also be clear that the eccentricity may be shifted through 180° to provide a similar displacement action but to move the lid upwards, in the case of a bottom closure employing the same mechanism as described hereinabove. Also in the case of a bottom closure the shafts 106 and 106a extending across the width of the closure lid may be replaced by stub shafts mounted at the sides of the lid. In this instance the drive means is adapted to act directly on at least one stub shaft on each side of the lid.

Figure 7:
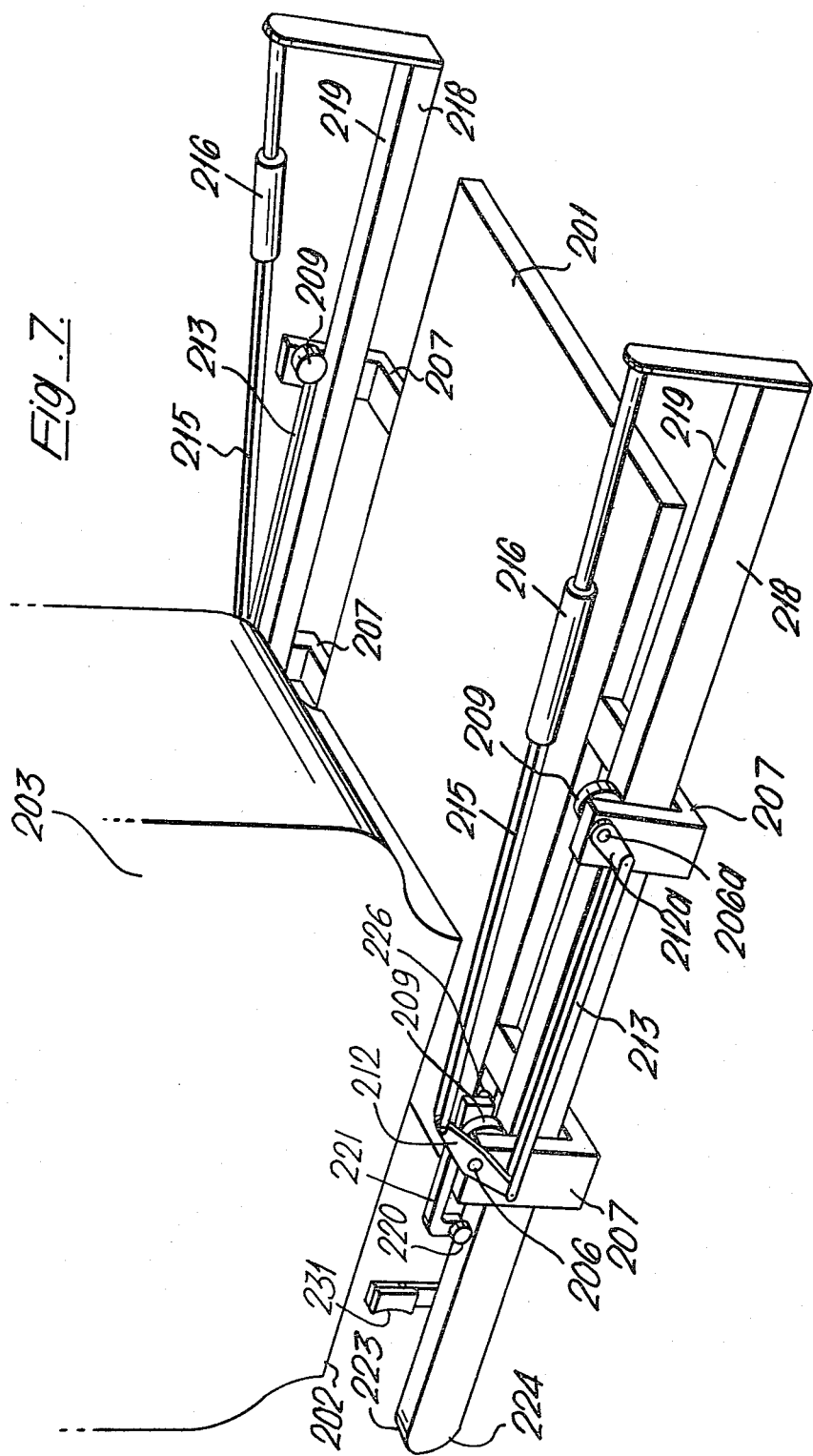
FIG. 7 is a similar view to that of FIG. 2, showing in perspective the arrangement of the moving and displacing mechanism in a second embodiment of the invention, shown as a bottom closure.

The foregoing description of the closure according to the invention relates to a closure for an upper opening in a canning retort, and while the bottom opening may be closed by a generally similar closure as already noted, the requirements of the installation may justify a construction for a bottom closure differing in its detailed structure from that provided for the upper or top opening. A closure for a bottom opening is shown in FIGS. 7–11. As shown in FIG. 7, it includes a lid 201 for the bottom opening 202 of a retort 203, which is longitudinally movable across the mouth of the opening to cover and uncover the opening, as well as being displaceable in a direction substantially perpendicular to its plane to come into sealing engagement with the sealing edge 204 of the opening 202. The edge 204 incorporates a sealing member 205 similar to that provided on the end of the upper opening.

Figure 8:
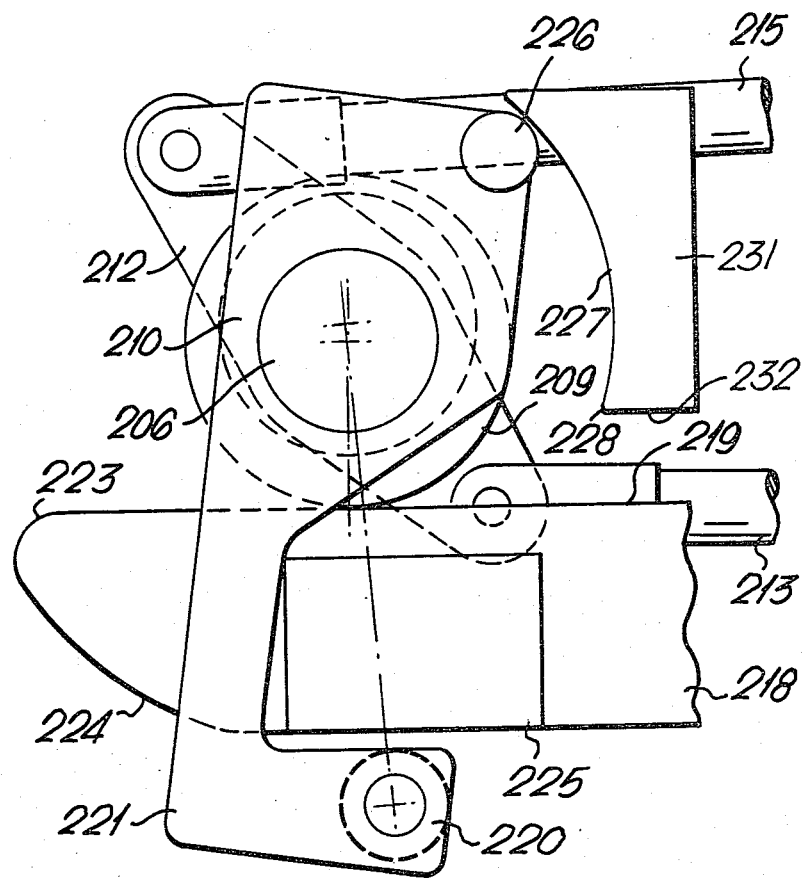
FIG. 8 shows in elevation the arrangement, partly simplified, of the support rollers and guide rollers for the bottom closure of FIG. 7.
Figure 9:
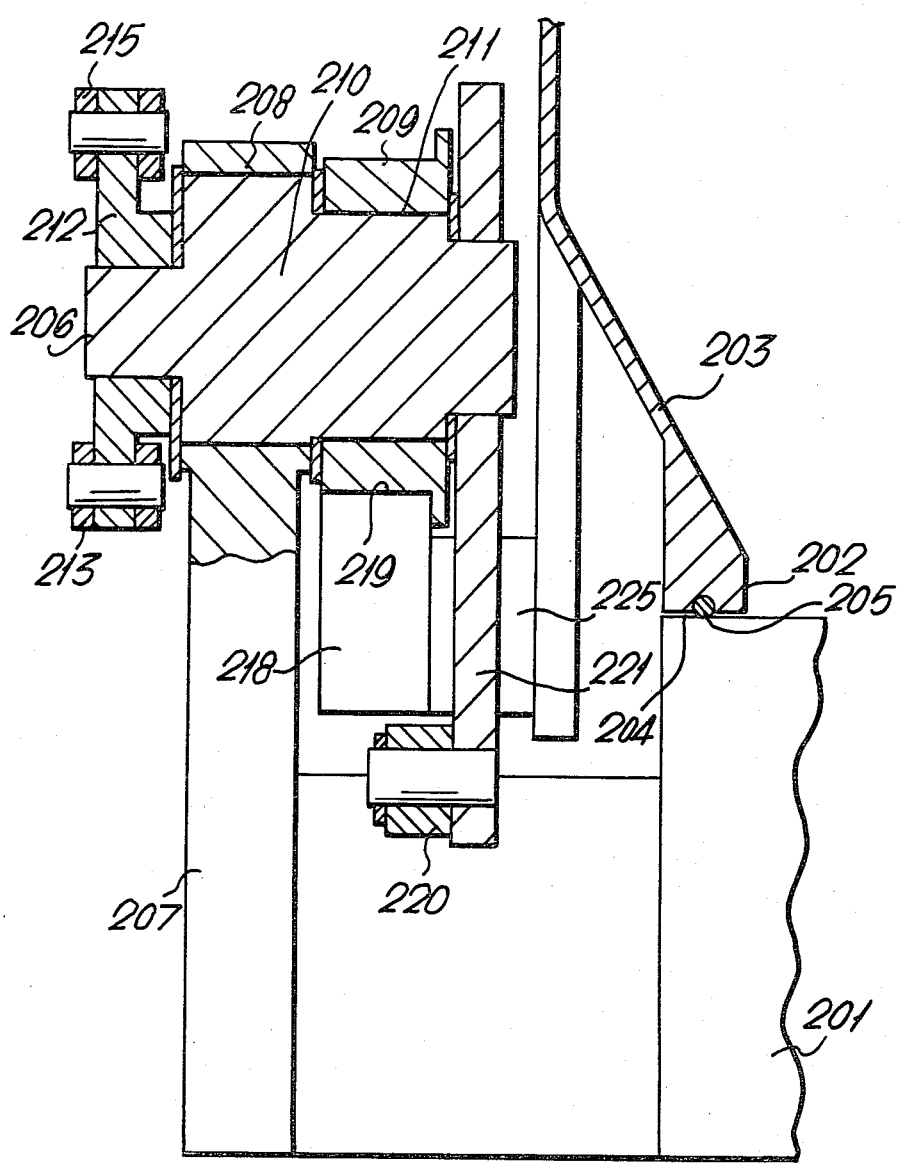
FIG. 9 is a sectional view of the rollers of FIG. 8 and their mounting.

Two pairs of stub shafts, respectively 206 and 206a, are provided on the lid in this instance, as compared with the shafts extending transversely across the full width of the lid in the embodiment previously described. Each shaft carries a support roller 209 at its inner end and the rollers are, in this embodiment, each coaxial with the respective shaft. The rollers 209 support the lid 201 for longitudinal movement between its open and covering positions in similar manner to that in which the rollers 109 support the top lid. Rollers 209 run on upper surfaces 219 of guide rails 218. The rollers 209 may be flanged on one side, as shown in FIG. 9. The flange is omitted in FIG. 8 for clarity.

Each shaft has an eccentric portion 210, by which it is rotatably mounted in an upwardly extending portion of a respective bracket 207 affixed to the lid 201. The rotatable mounting of the shafts 206 and 206a may be achieved by plain bearings as shown in FIG. 9 or by any other suitable bearing means. The brackets 207 have lower portions which extend outwardly beneath the guide rails 218, the upper surfaces 219 of which thus form guide surfaces in this construction of the closure according to the invention, corresponding to the guide surfaces 119 in the first embodiment of a closure for the top opening of the retort. The upwardly extending portions of the brackets are disposed outwardly of the guide rails 218.

Thus in this embodiment, the eccentricity relative to the shaft axis is provided in the shaft bearing, while the rollers are coaxial with the shaft. It will be clear however that the same kinematic relationship exists as in the embodiment first described, i.e. that the rollers and the shaft bearings are eccentric relative to each other. The final sealing displacement is again brought about by rotation of the shafts 206 and 206a, while the lid remains stationary in respect of longitudinal movement, being preferably restrained by a stop or otherwise prevented from further longitudinal movement when it reaches its covering position during a closing operation.

Each shaft 206 carries a double-ended rocker lever 212 which is keyed to its shaft. A drag-link 213 connects the lower end of such double-ended rocker lever 212 to the end of a lever arm 212a which is keyed to the shaft 206a on the same side of the lid. Each arm is similarly dimensioned to the lower portion of the lever 212 and is downwardly directed so that a rotational movement of the shaft 206 is transmitted to the arm 212a to cause an identical corresponding rotation of shaft 206a. A piston rod 215 extending from a pneumatic or hydraulic cylinder 216 is pivotally connected to the upper end of each lever 212. Unlike the construction for the first embodiment, each side of the lid is provided with an independent cylinder 216, the two being operated in tandem. The operation of the closure is similar to that for the top closure of the first embodiment, in that activation of the cylinders to close the pressure vessel will first of all cause the lid to be displaced longitudinally, the rollers running along the guide surfaces 219 of the guide rails 218, and rotation of the shafts 206 and 206a being prevented by means to be described which are similar in action to those provided on the top closure.

In addition to the support roller 209, each shaft 206 carries a guide roller 220 which is disposed forwardly of the roller 209 during said longitudinal closing movement and is rotatably mounted at the end of a lever 221 fixedly mounted on the shaft 206. Rotation of the shafts 206 is thus prevented during forward movement of the lid by the rollers 220 bearing against the surfaces 219 of the guide rails, in similar manner to the constraint imposed on the shaft 106 of the first embodiment. Downward movement of the guide roller 220 becomes possible when the roller arrives at a leading nose portion 223 of the guide rail 218. FIGS. 7 and 8, the guide surface curves downwardly and rearwardly to form a convex cam surface 224 similar to the surface 124 provided for the roller 120 of the top closure. However in this embodiment the cam surface 224 may be omitted. On a portion of the lever 221 extending rearwardly of the shaft there is an additional trailing roller 226 rotatably mounted on an axis parallel to the shaft. This trailing roller 226 (which is not seen in FIG. 9 due to the plane of the section) bears against a cam block 231 which forms part of the guide means. The cam block 231 has a bottom surface 232 parallel to guide surface 219, and a concave cam surface 227 extending upwardly therefrom with a nose 228 at the meeting of the said two surfaces. As the leading guide roller 220 is approaching the nose 223 during forward movement of the lid, the trailing roller 226 is engaged against bottom surface 232 of the block. When leading roller 220 reaches the nose 223, or shortly thereafter, trailing roller 226 clears nose 228 on the block and a stop may simultaneously prevent further forward movement of the lid. Leading roller 220 moves downwards, and trailing roller 226 moves upwards on cam surface 227; therefore the shaft 206 rotates and the eccentricity of the shaft portion 210 relative to the roller 209 causes the lid to be displaced upwardly into its sealing or locked condition.

It will be seen that the lever 221 is substantially L-shaped at its leading end. This construction is required in order to clear a mounting block 225 by which the guide rail 218 is secured in position on the retort, and is of no mechanical significance. The space relationship of the rollers 220 with respect to the shafts 206 may be brought about by any appropriate configuration of lever in any particular construction.

In the case of a top closure embodiment previously described, the return movement of the roller 120 to bring about the release of the lid before it is moved longitudinally is sufficiently provided for by the convex cam surface 124, which guides the cam back up onto the guide surface 118. In the case of the bottom opening however it is advantageous that the trailing roller 226 bears against concave cam surface 227 (FIG. 8) which serves to provide cam force causing the shaft 206 to rotate to bring the roller 220 back up onto the guide surface 218 and to displace the lid 201 back into its covering position. When the trailing roller 226 reaches the nose 228 of the cam surface 227, longitudinal movement again becomes possible. The arrangement is such that roller 220 reaches nose 223 substantially simultaneously with roller 226 reaching nose 228, and the convex cam surface 224 is not necessary.

Figure 10:
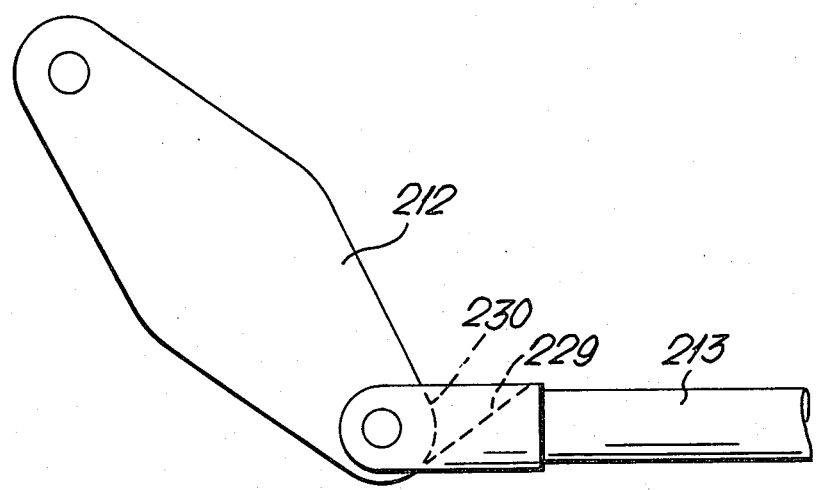
FIG. 10 shows in elevation the drag-link arrangement connecting the rocker arms of the leading and trailing support rollers on the bottom closure of FIGS. 7-9.
Figure 11:
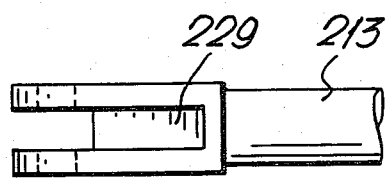
FIG. 11 is a top view of the leading end of the drag-link of FIG. 10.

It will also be noted that in this construction no upper guide surface corresponding to the surface 119 of the first embodiment is provided to prevent the roller 220 from moving upwards above the guide surface 219 as the shaft 206 rotates to bring it back up from the position which it occupies when the lid is sealed, and also during longitudinal opening movement of the lid. As the trailing roller 226 does not project from the same face of lever 221 as leading roller 220, the trailing roller 226 does not engage guide surface 219 (although in an alternative construction it could do so). Therefore a surface 229 is provided on the end of the drag-link member 213 against which a surface 230 of the lower portion of the double-ended rocker lever 212 bears when the lever 221 is positioned so that the roller 220 is above the level of the guide surface 219, i.e. when roller 220 rounds nose 223, and roller 226 rounds nose 228. This abutment of the surfaces 229 and 230 offers a simple and effective means of limiting the rotation of the shaft 206 in this direction without it being necessary to provide an additional guide rail. As shown in FIGS. 10 and 11, the end of the drag-link 213 connected to the rocker lever 212 is forked, so that the surface 229 is provided in a particularly convenient manner. It will be appreciated that a similar construction may also be applied to the top closure previously described in connection with the first embodiment.

If desired, the bottom surface 232 of the cam block 231 may be extended rearwardly so that trailing roller 226 engages this surface during the later part or all of its forward movement; in this case, the forward end of guide rail 218, with nose 223, may be omitted.

As described above, the top closure of the first embodiment is activated by a single cylinder, but clearly more than one cylinder could be provided for security, if such were desired. This may be necessary for heavy doors, and is usually required for the lower openings of retorts such as described hereinabove. The closing operation may also be brought about by other drive means, such as a rack and pinion drive or a wire mechanism. One roller 120 may be adequate, on one end only of the shaft 106, but preferably two are provided. One guide surface 124, for the return movement of roller 120, may be sufficient, even where two rollers are used, but in the case of a bottom closure, the provision of additional return cam surfaces is preferred. Micro-switches may be provided on the installation for triggering at the limits of movement and displacement of the lid or at intermediate stages, to provide interlocks and automatic initiation or termination of other operations during the canning cycle.

It should be noted that while the invention has been described in relation to a canning installation in which the cans are taken away from the retort by means of a conveyor in a water-filled canal, the invention may also be applied to retorts in installations in which the cans are handled by other means as well as to openable pressure vessels for use in processes other than canning. The types of bearings and rollers employed as well as the mechanical linkages used to connect the various operating parts of the closure may also be varied without departing from the scope of the invention.

The invention as shown in FIGS. 1–6 has been described in relation to an upper opening in a canning retort. It will be clear from the description that the orientation of the opening is not material to the operation of the closure and that this embodiment of the invention may equally be applied to a lower opening in such a retort, or indeed to an opening in the side of a pressure vessel, although in the latter instance, some measure of thrust support would need to be incorporated in the rollers and bearings. However, an alternative embodiment of the closure is preferred for a bottom opening and is described in relation to FIGS. 7–11. The invention is not limited to retorts and may be applied to any pressure vessel. It is also especially suited to vacuum chambers in that the creation of a vacuum within a vessel or chamber causes the closure lid to be retained more securely against the sealing edge of the opening. This is also of particular value in canning retorts, where a partial vacuum can be created in the region of the upper opening during the discharge stage.

The foregoing descriptions have related to the use of a roller as a cam follower member so as to restrain rotation of the shafts on which the guide rollers are mounted, during the longitudinal movement of the lid, by engagement of the cam follower roller against a cam surface or guide surface. It will be clear that other forms of follower member and guide means may be employed without departing from the scope of the invention and, in addition, the disposition of the cam with respect to the shaft may be varied, e.g. as already described, it may be trailing rather than leading in the closing direction of movement. The guide means may also be entirely separate from the surfaces on which the support rollers for the lid run. Alternatively and as described in connection with the bottom closure above, abutment means may be provided to limit rotation of the shafts during an opening operation.

Although in the embodiments described herein an aperture or discontinuity in a guide surface has been provided in the guide means, in order to permit rotation of the shafts (106, 206), other suitable configurations of interrupted guide means may be used, and two or more follower members may be used in a co-operative manner, with one follower member engaging a portion of the guide means during part of the travel in one direction and another follower member engaging another portion of the guide means during another part of the travel in the same direction.

Thus while the invention has been described with regard to the particular embodiments shown in the accompanying drawings, it extends to any equivalent constructions embodying the principles of the invention within the scope of the accompanying claims.

I claim:

1. A closure for a large sized opening in a pressure vessel, the opening having a peripheral sealing edge, comprising
   (a) a lid movable in a longitudinal direction relative to the opening between an open position of the lid and a covering position in which the lid is aligned with the opening but spaced apart from the sealing edge of the opening and displaceable in a direction perpendicular to the longitudinal direction between the covering position and a sealing position in which the lid is in sealing engagement with the edge of the opening,
   (b) bearings fixed to the lid,
   (c) at least two shafts rotatably mounted in the bearings and coupled for rotation together,
   (d) rollers mounted on the shafts, said rollers being eccentric relative to said bearings,
   (e) a support surface or surfaces extending in said longitudinal direction, said rollers travelling thereon during movement of the lid between its open and covering positions,
   (f) drive means for moving the lid in the longitudinal direction and for applying torque to the shafts in one sense during closing movement of the lid and in the opposite sense during opening movement of the lid,
   (g) at least one follower member fixedly secured to one of the shafts and
   (h) guide means engageable by the follower member or members or preventing rotation of the coupled shafts at least during a closing movement of the lid from its open position to its covering position, and for permitting rotation of the coupled shafts when the lid is in the covering position, the rotation of the shafts displacing the lid in said perpendicular direction between the covering position and the sealing position by the relative eccentricity of said rollers and bearings.

2. A closure for a large-sized opening in a pressure vessel, the opening having a peripheral sealing edge, comprising
   (a) a lid movable in a longitudinal direction relative to the opening between an open position of the lid and a covering position in which the lid is aligned with the opening but spaced apart from the sealing edge of the opening and displaceable in a direction perpendicular to the longitudinal direction between the covering position and a sealing position in which the lid is in sealing engagement with the edge of the opening,
   (b) bearings fixed to the lid,
   (c) at least two shafts rotatably mounted in said bearings and coupled for rotation together,
   (d) rollers mounted on the shafts, said rollers being eccentric relative to said bearings,
   (e) opposed spaced apart guide surfaces extending in said longitudinal direction, one of said guide surfaces being a support surface, and the ends of said shafts being received between said guide surfaces, said rollers being mounted on said shaft ends and being adapted for movement between said guide surfaces during movement of the lid between its open and covering positions,
   (f) drive means for moving the lid in the longitudinal direction and for applying torque to the shafts in one sense during closing movement of the lid and in the opposite sense during opening movement of the lid,
   (g) a lever fixedly secured to said ends of said shafts,
   (h) at least one follower member mounted on said lever, and
   (i) guide means engageable by the follower member for preventing rotation of the coupled shafts at least during a closing movement of the lid from its open position to its covering position, the guide means comprising surfaces extending in the longitudinal direction and the follower member being adapted for movement therebetween in the longitudinal direction, and the guide means having an aperture therein adapted to allow the follower member to pass therethrough, passage of the follower member through the aperture permitting the shafts to rotate for displacement of the lid in said perpendicular direction between the covering position and the sealing position by the relative eccentricity of said rollers and bearings.

3. A closure according to claim 1, wherein the guide means engageable by the follower member comprises a said support surface.

4. A closure according to claim 1, wherein the follower member is a roller and the guide means consists of opposed spaced apart bearing surfaces, the follower member engaging against one or other of the bearing surfaces depending on the direction of longitudinal movement of the lid.

5. A closure according to claim 1 comprising a cam surface for guiding the follower member during displacement of the lid between the sealing position and the covering position.

6. A closure according to claim 1, wherein a leading follower member is mounted on a lever extending forwardly of the leading shaft in the closing direction of longitudinal movement of the lid.

7. A closure according to claim 1 comprising (a) at least one trailing follower member which is mounted on a lever extending rearwardly of the shafts, and (b) a concave cam surface, said trailing follower member engaging said concave cam surface during displacement of the lid from its sealing position to its covering position.

8. A closure according to claim 1, comprising a lever arm or arms fixedly secured to one of said shafts, and a link member or members for coupling said other shaft or shafts to said one shaft, the drive means comprising at least one hydraulic or pneumatic piston and cylinder means adapted to act on said lever arm or arms.

9. A closure according to claim 8, wherein at least one of said link members comprises an abutment surface, and a said lever arm comprises corresponding abutment surface for engaging the abutment surface of the link member to limit rotation of the shafts during displacement of the lid from its sealing to its covering position.

10. A closure according to claim 1, wherein the guide means comprises a guide surface against which a follower member bears to prevent rotation of the shafts and an interruption in the guide surface which permits movement of the follower member in a direction associated with rotation of the shafts, said interruption being at the position reached by the follower member when the lid is in the covering position.

* * * * *